(12) United States Patent
Sawada et al.

(10) Patent No.: US 11,530,010 B2
(45) Date of Patent: Dec. 20, 2022

(54) WINDSHIELD DEVICE FOR VEHICLE

(71) Applicant: SUZUKI MOTOR CORPORATION, Hamamatsu (JP)

(72) Inventors: Fujimi Sawada, Hamamatsu (JP); Yuki Tomida, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 158 days.

(21) Appl. No.: 17/063,758

(22) Filed: Oct. 6, 2020

(65) Prior Publication Data

US 2021/0107584 A1 Apr. 15, 2021

(30) Foreign Application Priority Data

Oct. 10, 2019 (JP) .............................. JP2019-186581

(51) Int. Cl.
*B62J 17/04* (2006.01)

(52) U.S. Cl.
CPC ..................... *B62J 17/04* (2013.01)

(58) Field of Classification Search
CPC ....................................................... B62J 17/04
See application file for complete search history.

(56) References Cited

U.S. PATENT DOCUMENTS

| 9,132,875 | B2 * | 9/2015 | Kato | ........................ B62J 17/04 |
| 9,937,972 | B2 | 4/2018 | Nakano et al. | |

FOREIGN PATENT DOCUMENTS

| CN | 208498676 | U | * | 2/2019 |
| CN | 208498676 | U | | 2/2019 |
| EP | 3192729 | A1 | | 7/2017 |
| EP | 3219595 | A1 | | 9/2017 |
| JP | H04104086 | U | | 9/1992 |

OTHER PUBLICATIONS

German Office Action dated Feb. 9, 2022 (and English translation thereof) issued in German Application No. 10 2020 126 146.2.

* cited by examiner

*Primary Examiner* — D Glenn Dayoan
*Assistant Examiner* — Melissa Ann Bonifazi
(74) *Attorney, Agent, or Firm* — Holtz, Holtz & Volek PC (57) ABSTRACT

In a vehicle including a windshield (7) and a support structure for supporting the windshield, the support structure includes a pair of stays (11) that support the windshield movably in a rising and lowering direction, and a holder (20) that is provided in a different position from the pair of stays, and fixes a position of the windshield, and the holder includes a base portion (21) fixed to a vehicle body, a stopper (22) that is provided to face the base portion, capable of moving along the rising and lowering direction to the base portion, and moving in a direction to approach and separate from the base portion, and brings the windshield into a fixed state when approaching the base portion, and an operation member (23) that causes the stopper to move to contact and separate from the base portion, according to an operation.

11 Claims, 8 Drawing Sheets

WINDSHIELD DEVICE FOR VEHICLE

BACKGROUND OF THE INVENTION

Field of the Invention

The present invention relates to a windshield device for a vehicle.

Description of the Related Art

There is a vehicle such as a motorcycle capable of adjusting the height of a windshield (windscreen) that is arranged in front of the rider. For example, Patent Literature 1 (Japanese Utility Model Laid-Open No. 4-104086) describes a structure in which vertically elongated holes are respectively formed in a pair of support pillars disposed by being separated in a left-right direction of a vehicle, and a windshield is fixed to the support pillars by screws that are inserted into the vertically elongated holes. The height of the windshield can be changed by changing insertion positions of the screws along the vertically elongated holes.

In the windshield device in Patent Literature 1, it is necessary to perform operations of loosening the fixing screws, changing the height of the windshield, and then fastening the screws again for each of the pair of support pillars, when adjusting the height of the windshield. Further, in order to fix the windshield stably and reliably, it is necessary to perform a fixing operation while suitably managing the fastening torque or the like of the screws to both the support pillars. Furthermore, a tool for operating the screws is required. For these reasons, there has been a problem that the support structure of the windshield is complicated, and time and effort are required to adjust the height of the windshield.

SUMMARY OF THE INVENTION

The present invention is made in the light of the above point, and provides a windshield device for a vehicle that can make it easy to perform height adjustment of a windshield with a simple structure.

The present invention is, in a vehicle including a windshield located in front of a rider, and a support structure that supports the windshield to be capable of position adjustment in a rising and lowering direction, characterized in that the support structure includes a pair of stays that are provided, with positions made different in a vehicle body left-right direction, and support the windshield movably in the rising and lowering direction to a vehicle body, and a holder that is provided in a different position from the positions of the pair of stays, and fixes a position of the windshield in the rising and lowering direction, and the holder includes a base portion that is fixed to a vehicle body, a stopper that is provided to face the base portion, capable of moving along the rising and lowering direction to the base portion, and moving in a direction to approach and separate from the base portion, and brings the windshield into a fixed state when approaching the base portion, and an operation member that causes the stopper to move to contact and separate from the base portion, according to an operation.

According to the present invention, the functions are allotted so that the windshield is supported by the pair of stays to be capable of rising and lowering, and fixation and release of fixation of the windshield are performed by the holder that is provided in the separate position from the pair of stays, whereby the windshield device for a vehicle that makes it possible to perform height adjustment of the windshield easily with the simple structure can be obtained.

The present disclosure relates to subject matter contained in Japanese Patent Application No. 2019-186581 (filed on Oct. 10, 2019) which is expressly incorporated herein by reference in its entirety.

DETAILED DESCRIPTION OF THE PREFERRED EMBODIMENTS

Hereinafter, a windshield device for a vehicle according to a present embodiment will be described with reference to the accompanying drawings. A vehicle of the present embodiment is a motorcycle 1 (FIG. 1), and respective directions such as up and down, left and right, and front and rear in the following explanation mean directions with a vehicle body 2 of the motorcycle 1 as a reference.

Figure 1:
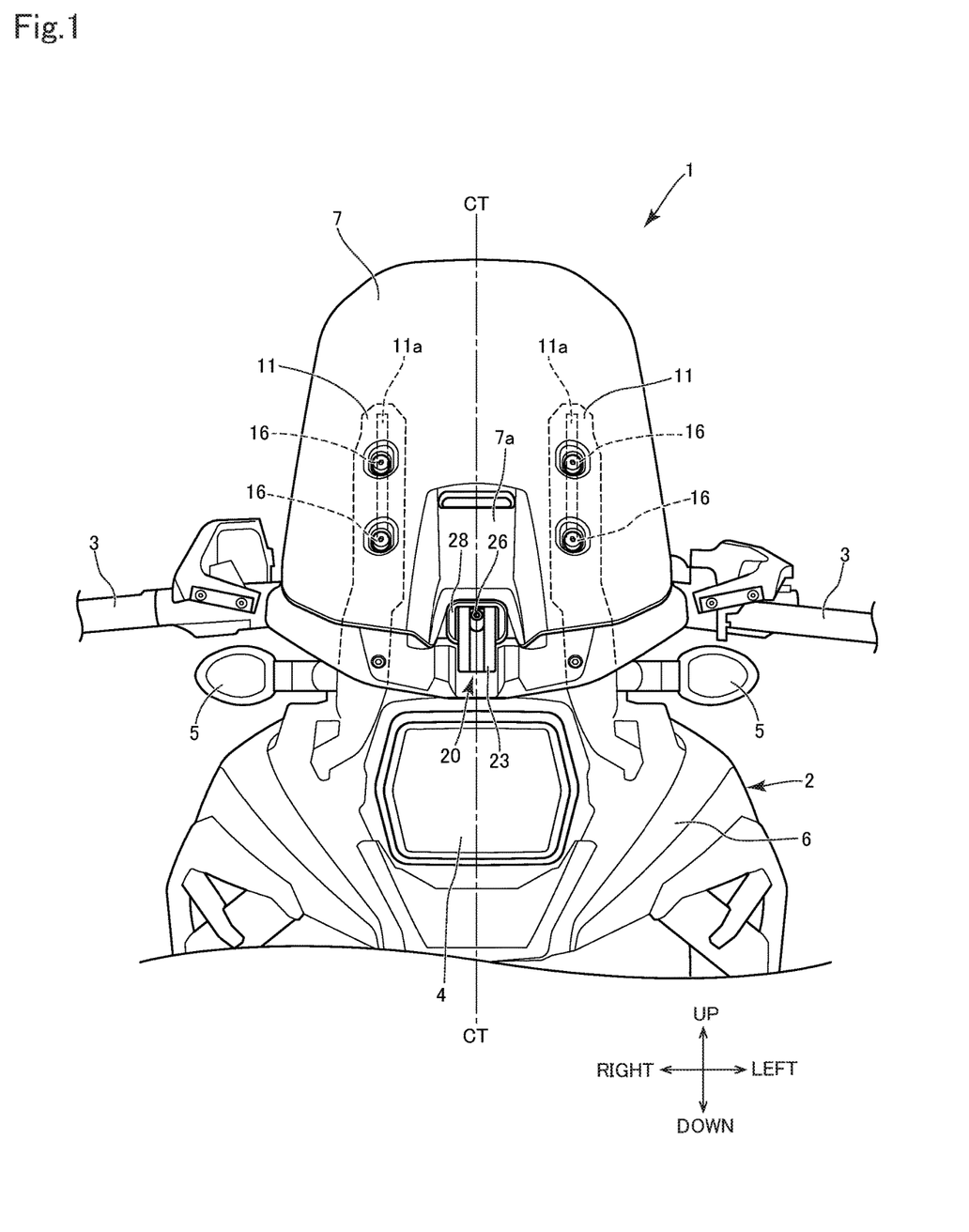
FIG. 1 is a view illustrating a windshield device and a vicinity of the windshield device for a motorcycle according to a present embodiment from a front.

FIG. 1 is a front view of a part of the motorcycle 1 seen from a front. The motorcycle 1 has a handle 3 protruding left and right from a front side upper portion of the vehicle body 2, and a rider steers a front wheel (not illustrated) via the handle 3. A headlight 4 is provided on a front surface of the vehicle body 2 that is lower than the handle 3, and above the headlight 4, a pair of left and right direction indicators 5 are provided. A vehicle body front part around the headlight 4 is covered with a front cowl 6. At a vehicle body front surface upper portion above the front cowl 6, a windshield (windscreen) 7 is provided. The windshield 7 is located in front of the rider of the motorcycle 1, and shields running wind toward the rider, or protects the rider from a flying object from a front, with the front cowl 6. The windshield 7 has a protruded shape in which a central portion in a vehicle body left-right direction protrudes most forward, and a forward protruding amount is decreased toward both a left and right sides.

Figure 3:
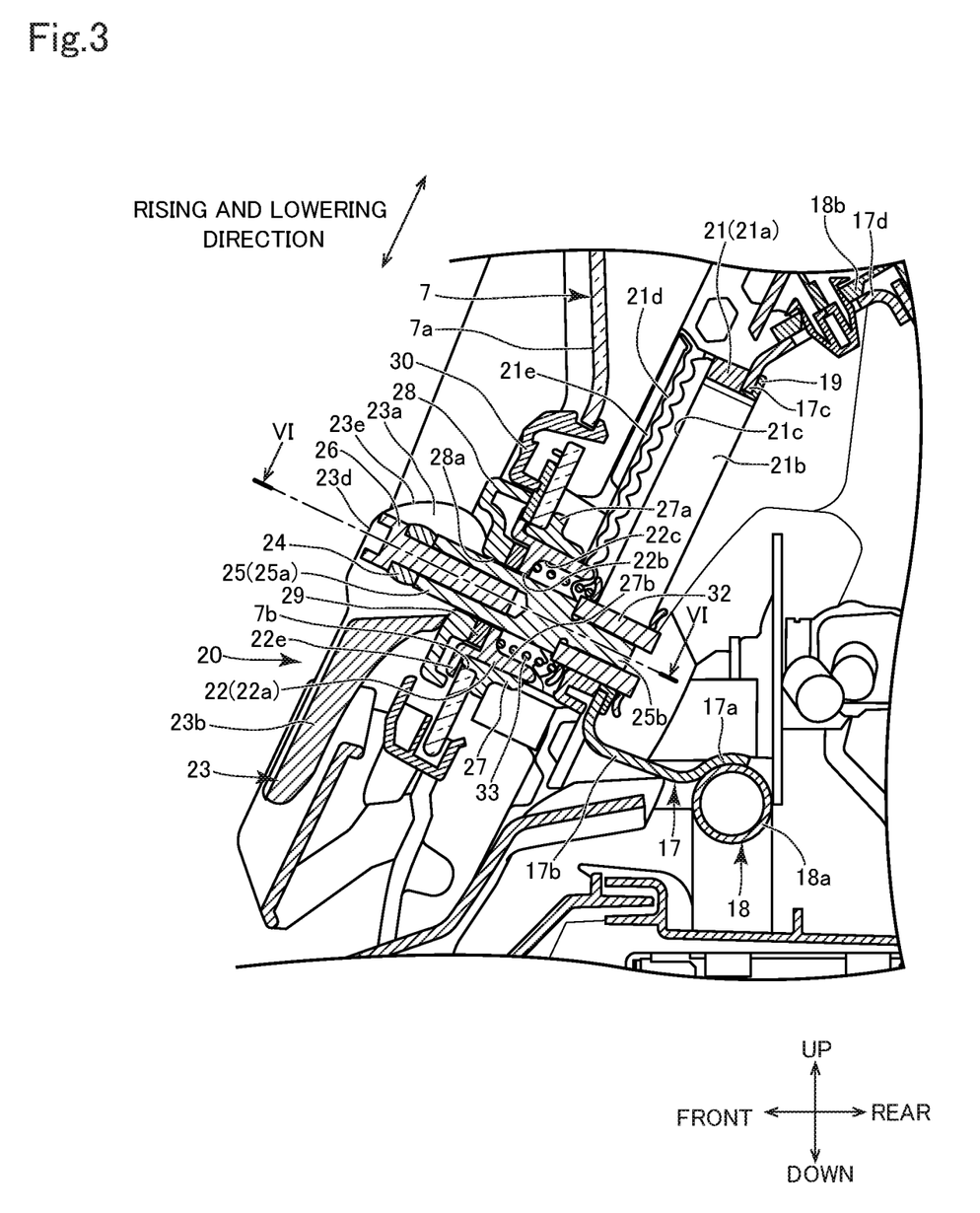
FIG. 3 is a sectional view along line III-III in FIG. 2.
Figure 4:
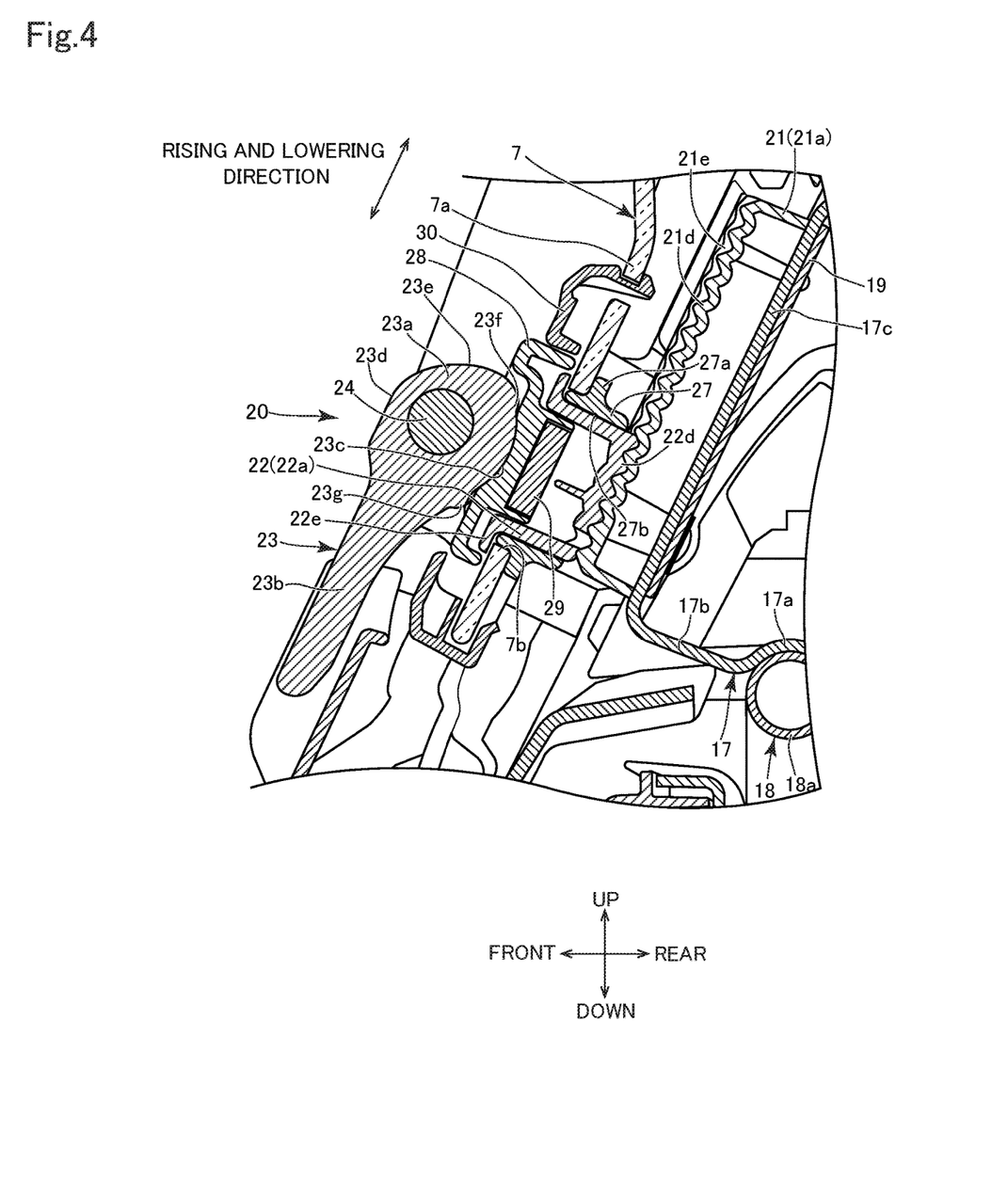
FIG. 4 is a sectional view illustrating a fixed state of the windshield along line IV-IV in FIG. 2.
Figure 5:
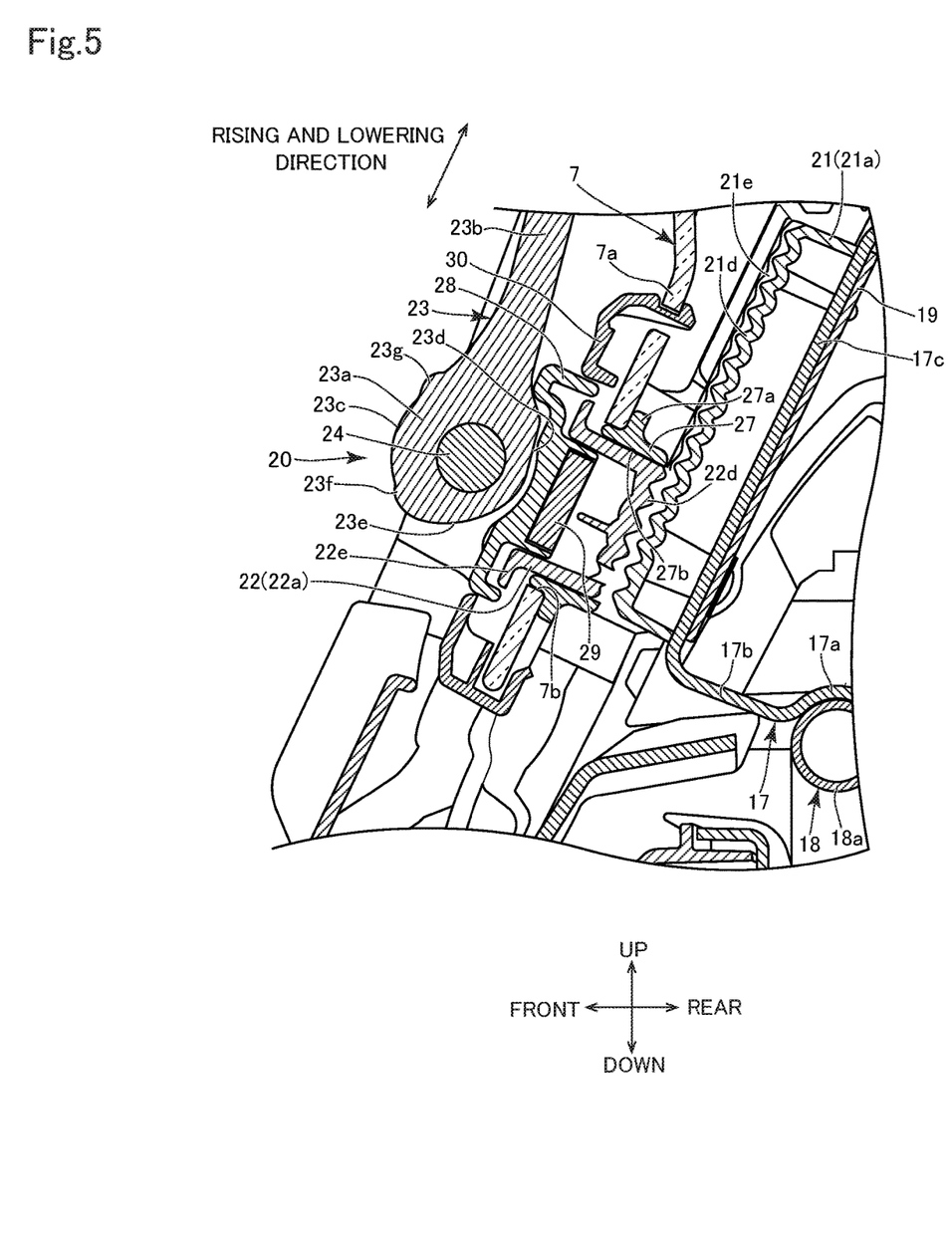
FIG. 5 is a sectional view illustrating a fixation release state of the windshield in a same sectional position as in FIG. 4.

The windshield 7 is capable of position adjustment in a substantially up-down direction of the vehicle body to the vehicle body 2. In more detail, as illustrated in FIG. 3 to FIG. 5, the windshield 7 is supported to be movable in a rising and lowering direction that is slightly inclined to the vehicle body up-down direction. A position (height position) of the windshield 7 in the rising and lowering direction is changed by an operation of the rider, and a spieling effect to the running wind or the like by the windshield 7 and a forward view around the windshield 7 can be changed. Hereinafter, a windshield device including the windshield 7 and a support structure for the windshield will be described.

Figure 2:
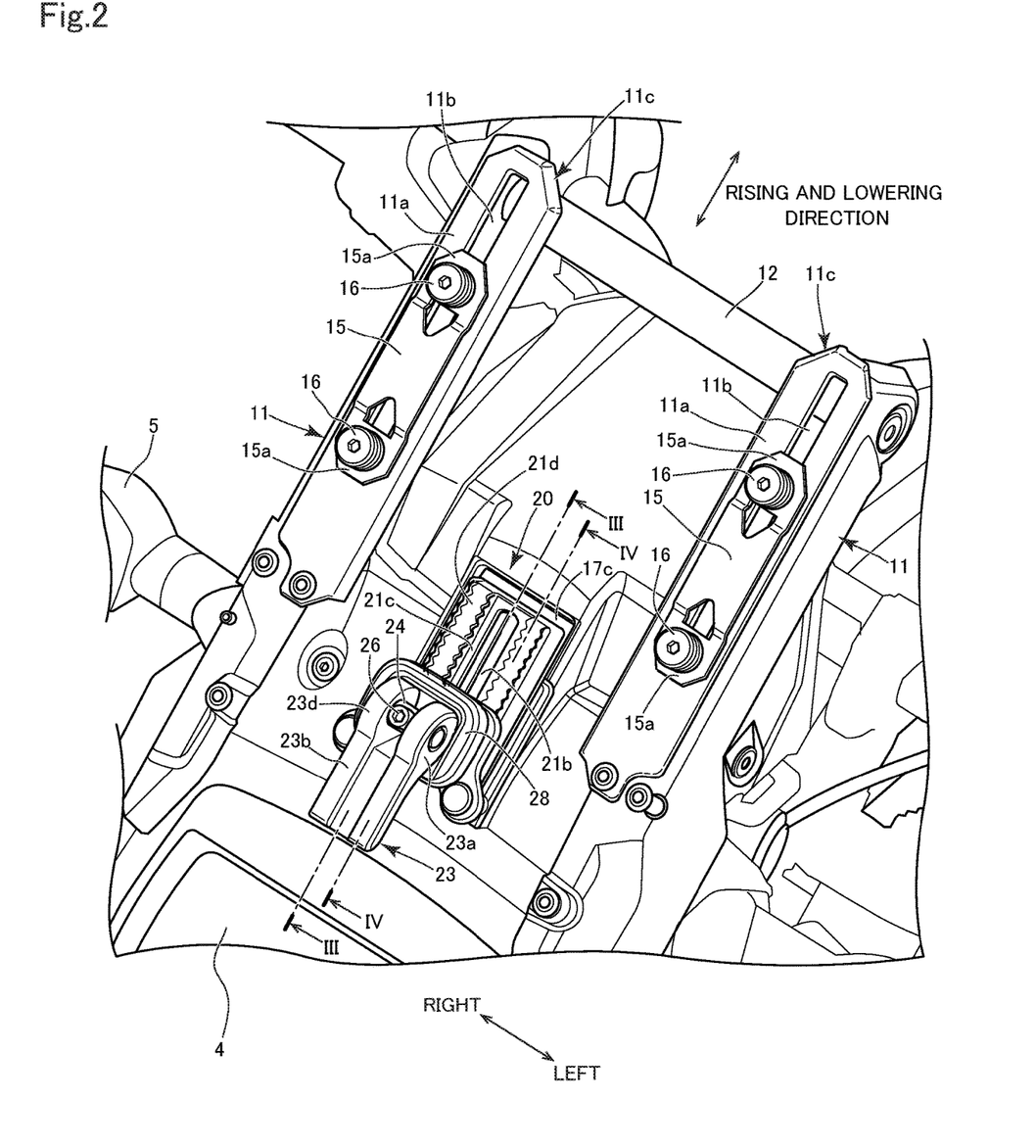
FIG. 2 is a perspective view illustrating a support structure of a windshield.

FIG. 2 illustrates the support structure for the windshield 7 in a state where the windshield 7 is removed. A pair of stays 11 are provided with positions made different in a left-right direction of the vehicle body 2. The pair of stays 11 are arranged substantially symmetrically about a center CT (FIG. 1) in the left-right direction of the vehicle body 2, and respectively extend in the rising and lowering direction of the windshield 7. Lower end portions of the respective stays 11 are in a relationship fixed to a frame structure configuring a frame of the vehicle body 2. Vicinities of upper ends of the pair of stays 11 are connected by a tubular cross girder portion 12 extending in the left-right direction, and rigidity is ensured. In each of the stays 11, a flat support surface 11a facing front and rear is provided, and a vertically elongated hole 11b that penetrates the support surface 11a in the front-rear direction and extends in the rising and lowering direction is formed.

Note that in the present embodiment, a plate-shaped portion having the support surface 11a, and a support portion that supports the plate-shaped portion are combined to configure the stay 11, and the plate-shaped portion and the support portion are integrated in advance. A cover 11c is attached to the plate-shaped portion, and a surface of the cover 11c has the support surface 11a. The cover 11c is formed from a resin, and excellent in protection performance at a time of sliding to an abutting mating member. Note that an assemblable stay with the plate-shaped portion and the support portion configured by separate bodies may be used. Further, the stay 11 is formed as a separate body from the frame structure, and thereafter may be fixed to the frame structure by means such as bolt fastening, and welding, or the stay 11 may be formed integrally with the frame structure. Absence or presence and a material of the cover 11c are also properly selectable.

A pair of sliders 15 are attached to the windshield 7 with positions made different in the left-right direction. The pair of sliders 15 have a space in the left-right direction corresponding to the pair of stays 11, and the respective sliders 15 are supported by the respective stays 11. Each of the sliders 15 is a plate-shaped body with a longitudinal direction oriented in the rising and lowering direction, and has seat surface portions 15a at both end portions in the longitudinal direction. Note that each of the sliders 15 is configured by a pair of members that are located front and rear with the support surface 11a sandwiched therebetween, and FIG. 2 illustrates only a member located at a front side of the support surface 11a, of the slider 15.

The pair of sliders 15 are disposed on a rear surface side of the windshield 7, and are attached to the windshield 7 via fastening portions 16. The fastening portion 16 is fastened to the seat surface portion 15a through a through-hole (not illustrated) formed in the windshield 7. Each of the sliders 15 is fastened with the fastening portions 16 in two upper and lower spots. A pair of front and rear members configuring each of the sliders 15 are in a relationship fixed by the fastening portions 16 with the support surface 11a therebetween.

The pair of left and right sliders 15 have the seat surface portions 15a abut on the support surfaces 11a, and receive support by the pair of left and right stays 11. Each of the fastening portions 16 is fastened to a guided portion (not illustrated) that is inserted into the vertically elongated hole 11b from a rear surface side of the stay 11, and the guided portion is guided movably in the rising and lowering direction along the vertically elongated hole 11b. By movement of the guided portion along the vertically elongated hole 11b, the position of the windshield 7 changes in the rising and lowering direction. A state where the guided portion at a lower side abuts on a lower end surface of the support surface 11a is a most lowering position in which the height of the windshield 7 is lowest, and a state where the guided portion at an upper side abuts on an upper end surface of the support surface 11a is a most rising position in which the height of the windshield 7 is highest. FIG. 2 illustrates a state of a support structure at a time of causing the windshield 7 to be in the most lowering position.

The vertically elongated hole 11b of each of the stays 11 limits movement of the guided portion (fastening portion 16) in the left-right direction, and the guided portion can smoothly move in the rising and lowering direction without causing rattling. Further, since a pair of guided portions (fastening portions 16) are provided in vicinities of both upper and lower ends of each of the sliders 15, each of the sliders 15 hardly falls or displaces with respect to each of the stays 11, and is stably supported. Further, since the windshield 7 is supported by the pair of stays 11 in positions separated in the left-right direction with the center CT (FIG. 1) in the left-right direction of the vehicle body 2 sandwiched between the pair of stays 11, stability and positional accuracy of the windshield 7 to the vehicle body 2 are excellent.

In this way, the windshield 7 is supported movably in the rising and lowering direction via the pair of stays 11. A holder 20 that is means for fixing the position of the windshield 7 in the rising and lowering direction is provided in a position different from the positions of the stays 11. As illustrated in FIG. 1 and FIG. 2, the holder 20 is located in a middle (on the center CT in the left-right direction of the vehicle body 2) of the pair of stays 11 in the left-right direction, and is located close to a lower edge of the windshield 7 in the rising and lowering direction. A position of the holder 20 in the rising and lowering direction is in the vicinity of the lower ends of the pair of stays 11, and an upper end of the holder 20 is located downward of a lower end of the vertically elongated hole 11b.

As illustrated in FIG. 3 to FIG. 5, a frame bracket 17 is provided behind an installation spot of the holder 20. The frame bracket 17 is fixed to a subframe 18. Meters and gauges such as a speed meter (not illustrated) are assembled to the subframe 18. The subframe 18 is fixed to a main frame (not illustrated) that configures a framework of the vehicle body 2. Accordingly, the frame bracket 17 and the subframe 18 are part (frame member) of a frame structure with the main frame. FIG. 3 to FIG. 5 illustrate part of the subframe 18, and the subframe 18 has a cylindrical portion 18a that forms a cylindrical shape extending in the left-right direction at a lower position behind the holder 20, and an upper plate portion 18b (FIG. 3) located above the cylindrical portion 18a.

The frame bracket 17 includes a fixed portion 17a that is fixed to the cylindrical portion 18a of the subframe 18, a forward extension portion 17b that is provided to extend forward from the fixed portion 17a, a support plate portion 17c that is provided to extend in the rising and lowering direction (obliquely upward) from the forward extension portion 17b, and a fixed portion 17d (FIG. 3) that continues to an upper end of the support plate portion 17c to be fixed to the upper plate portion 18b of the subframe 18. The frame bracket 17 is firmly fixed to the subframe 18 via the fixed portion 17a and the fixed portion 17d.

The holder 20 includes a base portion 21 that is fixed to a vehicle body 2 side, a stopper 22 that is provided at a windshield 7 side, and a cam lever 23 that is an operation member that causes the stopper 22 to move to connect and separate from the base portion 21, according to an operation.

Figure 8:
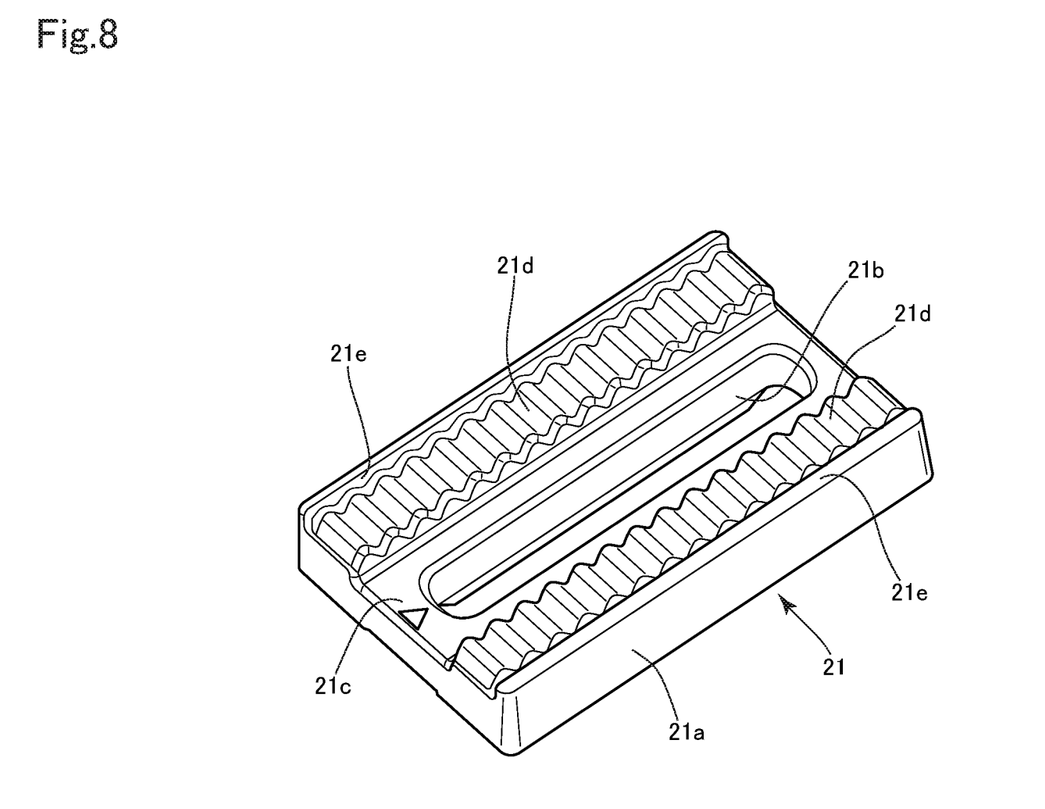
FIG. 8 is a perspective view illustrating a base portion.

As illustrated in FIG. 8, the base portion 21 has a block-shaped main body portion 21a that forms a substantially rectangular shape in front view and having a predetermined thickness in the front-rear direction. In a center in the left-right direction of the main body portion 21a, a linear slide guide groove 21b extending in the rising and lowering direction is formed. The slide guide groove 21b penetrates the main body portion 21a in the front-rear direction (thickness direction). A front surface side of a periphery of the slide guide groove 21b is a flat receiving surface 21c.

A pair of continuous depressions-and-projections portions 21d located left and right of the slide guide groove 21b and the receiving surface 21c are further provided on a front surface side of the main body portion 21a. Each of the continuous depressions-and-projections portions 21d has a corrugated configuration in which crests and troughs with ridges oriented in the left-right direction are alternately repeated in the up-down direction. At both sides of the left and right continuous depressions-and-projections portions 21d, a pair of left and right restraining walls 21e that protrude forward from the crests of the continuous depressions-and-projections portions 21d are provided.

Figure 6:
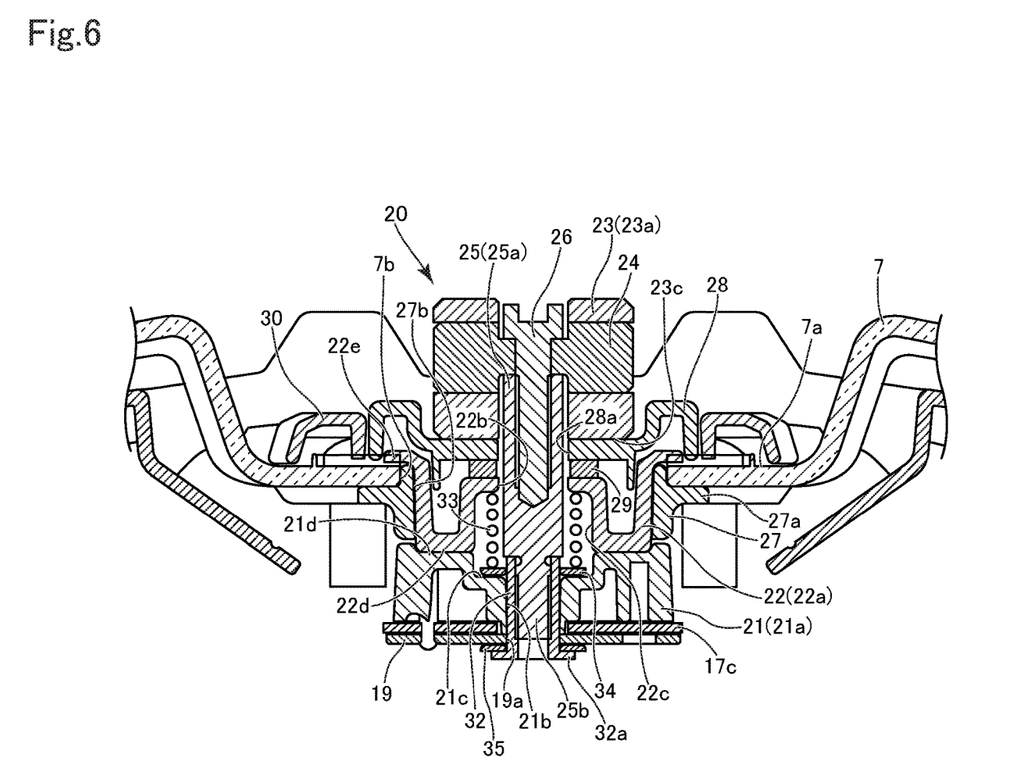
FIG. 6 is a sectional view along line VI-VI in FIG. 3.

As illustrated in FIG. 4 to FIG. 6, the base portion 21 is supported on a front surface side of the support plate portion 17c of the frame bracket 17. A back plate 19 is provided on a rear surface side of the support plate portion 17c, and the back plate 19 and the base portion 21 are fastened and fixed with rivets or the like with the support plate portion 17c between the back plate 19 and the base portion 21. Thereby, the base portion 21 is fixedly supported by the support plate portion 17c.

Figure 7A:
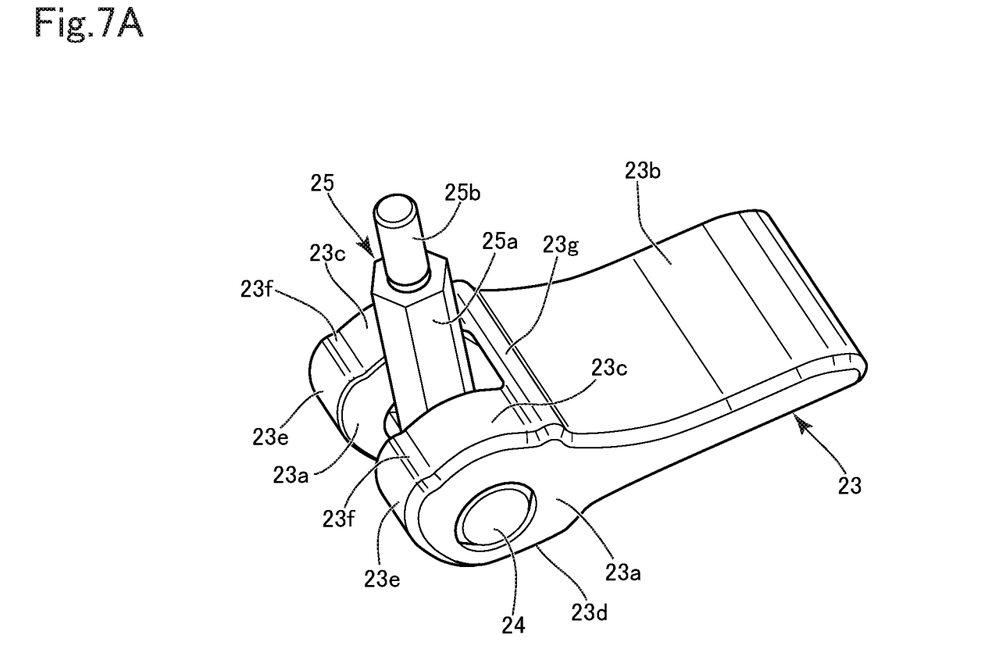
FIG. 7A is a perspective view of a cam lever.

With respect to the base portion 21 that is fixed to the vehicle body side, the stopper 22 and the cam lever 23 are provided on the windshield 7 side. FIG. 7A illustrates a state of the cam lever 23 alone, and FIG. 7B illustrates a state where the stopper 22 and the cam lever 23 are combined.

Figure 7B:
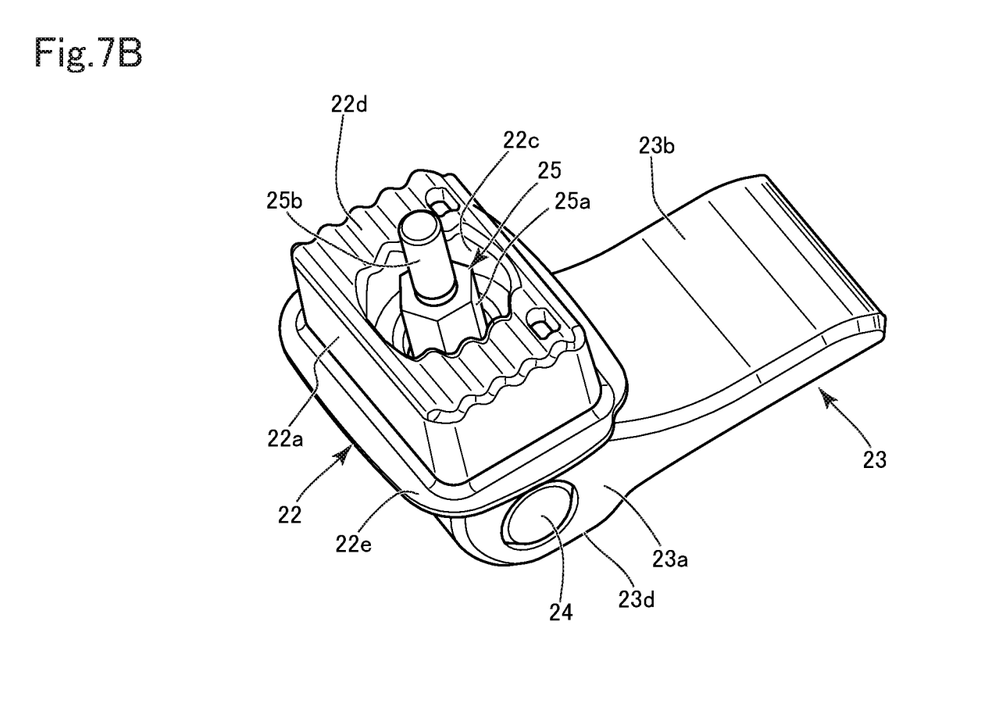
FIG. 7B is a perspective view of a state in which the cam lever and a stopper are combined.

As illustrated in FIG. 7B, the stopper 22 has a block-shaped main body portion 22a forming a substantially rectangular shape in front view and having a predetermined thickness in the front-rear direction. In a substantially center of the main body portion 22a, a through-hole that penetrates in the front-rear direction (thickness direction) is formed. The through-hole includes a hole portion 22b (see FIG. 3 and FIG. 6) that opens to a front surface side of the main body portion 22a, and a spring accommodation hole portion 22c (see FIG. 3, FIG. 6 and FIG. 7B) that opens to a rear surface side of the main body portion 22a, and the hole portion 22b and the spring accommodation hole portion 22c communicate with each other. An inside diameter of the spring accommodation hole portion 22c is larger than an inside diameter of the hole portion 22b.

On the rear surface side that faces the base portion 21, of the main body portion 22a of the stopper 22, a depressions-and-projections portion 22d that is fittable to the continuous depressions-and-projections portions 21d of the base portion 21 is formed. The depressions- and projections portion 22d has a corrugated configuration in which crests and troughs with ridges oriented in the left-right direction are alternately repeated in the up-down direction, and the crests and troughs on a depressions-and-projections portion 22d side are fittable to the troughs and crests on a continuous depressions-and-projections portions 21d side. In the rising and lowering direction of the windshield 7, a formation range of the continuous depressions-and-projections portions 21d is longer than a formation range of the depressions-and-projections portion 22d. Therefore, the depressions-and-projections portion 22d can be fitted while a position is changed in the rising and lowering direction to the continuous depressions-and-projections portions 21d. In a position close to the front surface of the stopper 22, a flange 22e that protrudes around the main body portion 22a is provided.

As illustrated in FIG. 7A, the cam lever 23 includes a base end portion 23a through which a lever hinge 24 extending in the left-right direction is inserted, and a lever portion 23b that is provided to extend from the base end portion 23a to a radial direction of the lever hinge 24. The base end portion 23a is supported rotatably around an axial line oriented in the left-right direction, with respect to the lever hinge 24. The base end portion 23a forms a bifurcated shape having a cutout in a middle portion in the axial direction (extending direction of the lever hinge 24).

On an outer surface of the base end portion 23a, a fixation holding surface 23c, a fixation release surface 23d and a cam surface 23e are formed with positions made different in a rotation direction of the cam lever 23 around the lever hinge 24. The fixation holding surface 23c is a curved surface having a predetermined curvature. The fixation release surface 23d is a surface that is located closer to the lever hinge 24 in a radial direction than the fixation holding surface 23c (that has a smaller protruding amount in the radial direction). The cam surface 23e is provided between the fixation holding surface 23c and the fixation release surface 23d, and is a surface in which an amount of protrusion from the lever hinge 24 to the radial direction gradually changes toward the rotation direction of the cam lever 23. The amount of protrusion of the cam surface 23e to the radial direction increases toward a fixation holding surface 23c side from a fixation release surface 23d side.

On the outer surface of the base end portion 23a, a resistance application portion 23f is further formed between the fixation holding surface 23c and the cam surface 23e (one end side of the fixation holding surface 23c). The resistance application portion 23f is a protruding portion having an amount of protrusion in the radial direction set so as to continue to a curving surface shape (locus) of the cam surface 23e, and has a chevron-shaped sectional shape formed discontinuously to the fixation holding surface 23c. Consequently, the resistance application portion 23f has a larger amount of protrusion in the radial direction than the adjacent fixation holding surface 23c, and the amount of protrusion is equal to a maximum value of the amount of protrusion in the radial direction of the cam surface 23e. Due to this structure, in order to rotate the cam lever 23 beyond the resistance application portion 23f, a largest rotational force in a movable range is required. Further, another resistance application portion 23g is formed at the other end side (in a vicinity of a boundary of the base end portion 23a and the lever portion 23b) of the fixation holding surface 23c. The resistance application portion 23g is a protruding portion having a chevron-shaped sectional shape similar to the sectional shape of the resistance application portion 23f, and has a larger amount of protrusion in the radial direction than the adjacent fixation holding surface 23c and the resistance application portion 23f. Accordingly, the resistance application portion 23g can allow the rider to recognize a rotation limit position of the cam lever 23.

To the lever hinge 24, a center bolt 25 extending in the radial direction is fixed via a hinge bolt 26 (see FIG. 2, FIG. 3 and FIG. 6). The center bolt 25 has a prismatic shape portion 25a with a noncircular section that protrudes outside of the cam lever 23 through the cutout of the base end portion 23a, and a screw portion 25b is provided at a tip of the prismatic shape portion 25a (see FIG. 7A).

The windshield 7 has a recessed portion 7a that recesses rearward, closely to a lower edge of a middle position of a region receiving support by the pair of stays 11 (see FIG. 1). The stopper 22 and the cam lever 23 that configure the holder 20 are assembled to the recessed portion 7a of the windshield 7. The assembled state is illustrated in FIG. 3 to FIG. 6.

A through-hole 7b that penetrates the windshield 7 front and rear is formed in a vicinity of a lower edge of the recessed portion 7a. The main body portion 22a of the stopper 22 is inserted into the through-hole 7b. A stopper holder 27 is attached to an outside of the main body portion 22a. The stopper holder 27 is fixed to the windshield 7 in such a manner as to be fitted to an inner surface of the through-hole 7b, a square-shaped holding hole 27b is formed inside of the stopper holder 27, and the main body portion 22a of the stopper 22 is inserted into the holding hole 27b. By a relationship between the holding hole 27b and the main body portion 22a, the stopper 22 is supported movably front and rear (axial direction of the center bolt 25) to the stopper holder 27. The flange 22e provided at the stopper 22 is located on the front surface side of the windshield 7 (recessed portion 7a), a flange 27a provided at the stopper holder 27 is located on a rear surface side of the windshield 7 (recessed portion 7a), and the flange 22e and the flange 27a are in a relationship of facing each other front and rear with the windshield 7 around the through-hole 7b therebetween.

A lock slider 28 in a shape covering a front of the stopper 22 is provided, and a cushion 29 is sandwiched between the lock slider 28 and the stopper 22 (main body portion 22a). In the lock slider 28, a hole portion 28a communicating with the hole portion 22b of the stopper 22 is formed. The prismatic shape portion 25a of the center bolt 25 is inserted into the hole portion 22b of the stopper 22 and the hole portion 28a of the lock slider 28.

As illustrated in FIG. 3 and FIG. 6, the prismatic shape portion 25a of the center bolt 25 protrudes forward of the lock slider 28, and a protruding portion of the center bolt 25 is fixed to the lever hinge 24 via the hinge bolt 26. In the center bolt 25, a screw hole in which the hinge bolt 26 is screwed is formed, and the center bolt 25 is fixed to the lever hinge 24 by the hinge bolt 26 that penetrates the lever hinge 24 being screwed and fastened into the screw hole.

As illustrated in FIG. 3 and FIG. 6, a nut 32 is screwed onto the screw portion 25b of the center bolt 25. The nut 32 is inserted into the slide guide groove 21b of the base portion 21, and is guided movably in the rising and lowering direction of the windshield 7 along the slide guide groove 21b.

As illustrated in FIG. 6, an escape groove 19a that communicates with the slide guide groove 21b is formed in the back plate 19. The nut 32 that is inserted into the slide guide groove 21b further penetrates the escape groove 19a and protrudes to a rear surface side of the back plate 19. The escape groove 19a extends in the rising and lowering direction of the windshield 7, so that the back plate 19 does not hinder movement of the nut 32 along the slide guide groove 21b.

As illustrated in FIG. 6, a flange 32a provided at an end portion of the nut 32 abuts on a nut receiving plate 35, and the nut receiving plate 35 abuts on the rear surface side of the back plate 19. The nut 32 is restrained from moving forward from the position, so that when predetermined fastening torque is applied to the nut 32, a position of the lever hinge 24 in the axial direction of the center bolt 25 is fixed, and an axial distance from the lever hinge 24 to the base portion 21 (the support plate portion 17c, the back plate 19 and the nut receiving plate 35) becomes constant. The base end portion 23a of the cam lever 23, the lock slider 28, the cushion 29 and the stopper 22 are located to be sandwiched between the lever hinge 24 and the base portion 21.

In the recessed portion 7a of the windshield 7, a lock cover 30 is attached around the lock slider 28. Of elements configuring the holder 20, respective portions except for the cam lever 23 and a front surface portion of the lock slider 28 are in a position covered with the lock cover 30, and are not exposed to an outside. By being covered with the lock cover 30, appearance quality around the holder 20 can be improved, and a foreign matter can be prevented from entering into operating portions of the holder 20 from outside.

A relationship among the above respective components is summarized as follows. The nut 32 and the center bolt 25 are supported movably in the rising and lowering direction of the windshield 7 along the slide guide groove 21b, with respect to the base portion 21 and the back plate 19 that are fixed to the vehicle body side (support plate portion 17c). The stopper 22 and the lock slider 28 in which the center bolt 25 is inserted through the hole portion 22b and the hole portion 28a, and the stopper holder 27 that is fitted to the outside of the stopper 22 are movable rising and lowering portions that move in the rising and lowering direction with the nut 32 and the center bolt 25. Further, the lever hinge 24 connected to the center bolt 25, and the cam lever 23 pivotally supported by the lever hinge 24 are also movable rising and lowering portions that move in the rising and lowering direction with the nut 32 and the center bolt 25. Since the stopper holder 27 is fitted to the through-hole 7b, the windshield 7 also moves in the rising and lowering direction with these rising and lowering portions.

Of these rising and lowering portions, the stopper 22 and the lock slider 28 are further movable in the axial direction of the center bolt 25, and a space from the base portion 21 changes by the movement in the axial direction.

The continuous depressions-and-projections portions 21d of the base portions 21 and the depressions-and-projections portion 22d of the stopper 22 face each other in the axial direction of the center bolt 25, and when the stopper 22 approaches the base portion 21, the depressions-and-projections portion 22d and the continuous depressions-and-projections portions 21d are fitted to each other (FIG. 3, FIG. 4 and FIG. 6). When the depressions-and-projections portion 22d and the continuous depressions-and-projections portions 21d are fitted to each other, movement in the rising and lowering direction of the stopper 22 to the base portion 21 is restrained. Consequently, all the rising and lowering portions including the stopper 22 are in a fixed state where the rising and lowering portions are restrained from moving to rise and lower. In the fixed state, the restraining wall 21e of the base portion 21 is located at a side of the main body portion 22a of the stopper 22, and suppresses displacement of the stopper 22 in the left-right direction. When the stopper 22 separates from the base portion 21 and fitting of the depressions-and-projections portion 22d and the continuous depressions-and-projections portions 21d is released (FIG. 5), all the rising and lowering portions including the stopper 22 are brought into a fixation release state where all the rising and lowering portions are movable to rise and lower.

In the fixed state of the rising and lowering portions, the rising and lowering movement of the windshield 7 is restrained, and the windshield 7 is fixed to a fixed position in the rising and lowering direction. In the fixation release state of the rising and lowering portions, the rising and lowering movement of the windshield 7 becomes possible, and the pair of sliders 15 are moved in the rising and lowering direction by receiving guide of the pair of stays 11, and the height position of the windshield 7 can be changed. Since the formation range of the continuous depressions-and-projections portions 21d is longer than the formation range of the depressions-and-projections portion 22d in the rising and lowering direction of the windshield 7, there are positions of a plurality of stages in which the continuous depressions-and-projections portions 21d and the depressions-and-projections portion 22d can be fitted, and a desired height position can be selected from these positions of the plurality of stages. In other words, the position of the windshield 7 can be adjusted stepwise according to a number of stages of the continuous depressions-and-projections portions 21d and the depressions-and-projections portion 22d.

The holder 20 includes a spring 33 (FIG. 3 and FIG. 6) that urges the stopper 22 to the position of the fixation release state. The spring 33 is a compression spring in a coil form, and is disposed in the spring accommodation hole portion 22c to surround the prismatic shape portion 25a of the center bolt 25. One end of the spring 33 abuts on a bottom surface of the spring accommodation hole portion 22c. The other end of the spring 33 abuts on a spring receiving plate 34 (FIG. 6) that is supported on the receiving surface 21c of the base portion 21. The spring 33 urges the stopper 22 forward (direction to separate from the base portion 21) by a reaction force to compression in the axial direction.

By a rotational operation of the cam lever 23, the stopper 22 is moved in the axial direction of the center bolt 25. The cam lever 23 is capable of reciprocally rotating (swinging) to the fixed position illustrated in FIG. 1 to FIG. 4 and FIG. 6, and the fixation release position illustrated in FIG. 5.

In the fixed position of the cam lever 23, the fixation holding surface 23c faces the stopper 22 side (rearward) to contact the front surface of the lock slider 28, and the fixation holding surface 23c having a large amount of protrusion in the radial direction pushes the lock slider 28 rearward. The pressing force is transmitted to the stopper 22 via the cushion 29, and presses the stopper 22 against a base portion 21 side. As a result, the stopper 22 approaches the base portion 21 against the urging force of the spring 33 to bring about the fixed state where the continuous depressions-and-projections portions 21d and the depressions-and-projections portion 22d are fitted to each other.

When the cam lever 23 is rotated from the fixed position to the fixation release position, the cam surface 23e faces the stopper 22 side (rearward), and what contacts the front surface of the lock slider 28 changes from the fixation holding surface 23c to the cam surface 23e. The cam surface 23e has such a shape that gradually decreases a pressing amount to the lock slider 28 (gradually decreases the amount of protrusion in the radial direction) when the cam lever 23 rotates to the fixation release position. Therefore, when the cam lever 23 rotates to the fixation release position, the force that fits the continuous depressions-and-projections portions 21d and the depressions-and-projections portion 22d is gradually weakened.

When the cam lever 23 reaches the fixation release position, the fixation release surface 23d faces the stopper 22 side (rearward), and the fixation release surface 23d faces the front surface of the lock slider 28. The fixation release surface 23d has a smaller amount of protrusion (pressing amount) to the radial direction as compared with the fixation holding surface 23c and the cam surface 23e, and releases pressing of the stopper 22 to the base portion 21 side. In other words, the fixation release surface 23d allows the stopper 22 and the lock slider 28 to separate from the base portion 21, and move to the position where fitting of the depressions-and-projections portion 22d to the continuous depressions-and-projections portions 21d is released. Consequently, in the fixation release position of the cam lever 23, by the urging force of the spring 33, the stopper 22 and the lock slider 28 separate from the base portion 21, and the fixation release state is brought about, where fitting of the continuous depressions-and-projections portions 21d and the depressions-and-projections portion 22d is completely released.

When the cam lever 23 is rotated from the fixation release position to the fixed position, the cam surface 23e gradually increases the pressing amount to the lock slider 28, and the pressing force is transmitted from the lock slider 28 to the stopper 22 via the cushion 29. The stopper 22 approaches the base portion 21 against the urging force of the spring 33, and when the cam lever reaches the fixed position, the fixed state is brought about, where the continuous depressions-and-projections portions 21d and the depressions-and-projections portion 22d are completely fitted.

As illustrated in FIG. 4, in the fixed position of the cam lever 23, the resistance application portion 23f and the resistance application portion 23g that are provided at both sides of the fixation holding surface 23c face the front surface of the lock slider 28. When the cam lever 23 is rotated from the fixed position to the fixation release position, and when the cam lever 23 is rotated from the fixation release position to the fixed position, the resistance application portion 23f that has a larger amount of protrusion in the radial direction than either one the fixation holding surface 23c and the fixation release surface 23d abuts on the front surface of the lock slider 28 in a middle of a rotational range of the cam lever 23. In the state where the resistance application portion 23f abuts on the lock slider 28, rotation resistance to rotation of the cam lever 23 increases more and a larger operation force is required to rotate the cam lever 23 than in the state where the fixation holding surface 23c or the fixation release surface 23d abuts on the lock slider 28.

When the cam lever 23 is rotated from the fixation release position to the fixed position, abutment of the resistance application portion 23f to the lock slider 28 occurs just before the fixed position, and a load (resistance) to rotation of the cam lever 23 temporarily increases. When the cam lever 23 is further rotated, and a target to abut on the lock slider 28 is switched from the resistance application portion 23f to the fixation holding surface 23c (rides over the resistance application portion 23f), the load to rotation of the cam lever 23 slightly decreases. By the load variation, the rider who operates the cam lever 23 can be allowed to recognize arrival at the fixed position.

Rotating the cam lever 23 to the fixation release position (clockwise direction in FIG. 3 and FIG. 4) when the cam lever 23 is in the fixed position, a rotation load by the resistance application portion 23f acts before the target to abut on the lock slider 28 moves from the fixation holding surface 23c to the cam surface 23e. In other words, a configuration is adopted, in which at the time of release of the cam lever 23 from the fixed position, a force to ride over the resistance application portion 23f is required first. This configuration can prevent the cam lever 23 from erroneously moving from the fixed position to the fixation release position (fixation of the windshield 7 being released unintentionally) due to vibration applied at a time of travel of the motorcycle 1, other outer forces or the like.

The resistance application portion 23g is a second resistance application portion that forms a pair with the resistance application portion 23f to act, in the fixed position of the cam lever 23. In other words, when the cam lever 23 is in the fixed position, the resistance application portion 23g increases the rotation resistance to rotation of the cam lever 23 in an opposite direction (counterclockwise direction in FIG. 3 and FIG. 4) to a side where the resistance application portion 23f is provided (direction to move to the fixation release position), and prevents the rider from further performing a rotation operation of the cam lever 23, and thereby can allow the rider to recognize arrival at the rotation limit position.

By the operations of the resistance application portion 23f and the resistance application portion 23g, the cam lever 23 is stably held in the fixed position, and vibration and the like of the cam lever 23 at the time of travel of the motorcycle 1 can be suppressed. Thereby, the lever portion 23b of the cam lever 23 is maintained in the state along the windshield 7, and appearance quality of the windshield device can be enhanced. Further, occurrence of an unnecessary gap around the cam lever 23 is suppressed, and the fixed state of the windshield 7 can be more reliably maintained by preventing entrapment of a foreign matter and the like.

When height adjustment of the windshield 7 is performed by the above windshield device, the cam lever 23 in the fixed position (FIG. 1 to FIG. 4 and FIG. 6) is rotated to be raised to the fixation release position (FIG. 5) to bring the holder 20 into the fixation release state, and the windshield 7 is gripped and caused to move in the rising and lowering direction. The windshield 7 is supported and guided by the pair of stays 11 that are provided by being separated in the left-right direction, and therefore can be smoothly moved with high accuracy without generating an inclination. When the windshield 7 is moved to a desired height position, the cam lever 23 is rotated from the fixation release position (FIG. 5) to the fixed position (FIG. 1 to FIG. 4 and FIG. 6), and the windshield 7 is brought into the fixed state. Note that after fixation of the holder 20 is released, the windshield 7 may be moved to rise and lower by gripping the cam lever 23 or the like. If the holder 20 is of a structure that can transmit a force in the rising and lowering direction from the cam lever 23 to the windshield 7, it is possible to cause the cam lever 23 to move the windshield 7 by applying the force while gripping the cam lever 23 that is operated to the fixation release position as it is. The cam lever 23 is provided in a vicinity of the center of the windshield 7 in the left-right direction (on the center CT in the left-right direction of the vehicle body 2), and therefore can transmit the force in the rising and lowering direction evenly from the cam lever 23 to the windshield 7.

Since the holder 20 guides the movement of the nut 32 and the center bolt 25 in the rising and lowering direction along the slide guide groove 21b formed in the base portion 21, the movable portions of the holder 20 can be stably moved with the windshield 7 with high accuracy when the windshield 7 is moved to rise and lower by guide of the vertically elongated holes 11b of the pair of stays 11. The movable amount of the nut 32 and the center bolt 25 to the slide guide groove 21b corresponds to the moving amount of each of the sliders 15 (amount of the movable range of the windshield 7) to each of the stays 11.

As a layout of the entire windshield device, basic holding (holding that makes it possible to move in the rising and lowering direction) of the windshield 7 is performed by the pair of left and right stays 11, and the holder 20 for fixing the position of the windshield 7 is disposed in a middle position of the pair of stays 11 in the left-right direction. In other words, while left and right balance of holding of the windshield 7 is kept by the pair of stays 11, the holder 20 that performs fixation and fixation release of the windshield 7 is integrated in one spot. Thereby, height adjustment of the windshield 7 can be easily performed by only operating the holder 20 in the one stop without performing an operation that requires time and effort to the individual stays 11, and convenience and comfortableness of the motorcycle 1 are improved. For example, the height of the windshield 7 can be changed quickly and reliably during a short stop time of the motorcycle 1.

The windshield 7 has a protruded shape in which a vehicle center side protrudes most forward, and amounts of protrusion to the front are decreased toward both the left and right sides, to secure windshield performance and reduce air resistance. Therefore, it is possible to secure the installation space for the holder 20 by forming the recessed portion 7a in the vicinity of the center of the windshield 7, and it is possible to achieve both securement of the windshield performance by the windshield 7, and installation of the holder 20 excellent in space efficiency. Further, the position of the holder 20 in the rising and lowering direction is in the vicinity of the lower edge (vicinities of the lower ends of the pair of stays 11) of the windshield 7, and therefore even if the holder 20 is placed on the center CT in the left-right direction of the vehicle body 2, an effective area of the windshield 7 can be sufficiently secured.

Since a mechanism for fixing the windshield such as the holder 20 does not provide in portions along the respective stays 11, it is possible to simplify the structure around the stays 11 and compactify the support structure, and the degree of freedom of design of the windshield 7 is improved.

In the holder 20, the fixed state and the fixation release state of the windshield 7 are switched by adopting the cam lever 23 as the operation member, and reciprocally rotating the cam lever 23 to the two positions of the fixed position and fixation release position, and therefore axial force management for fixing the windshield 7 is easy. It is not necessary for the rider to perform fine adjustment in fixing the windshield 7, and it is possible to obtain a desired holding force reliably by the operation of the cam lever 23 without being influenced by difference in operation force of each rider. It is possible to obtain a stable axial force by properly setting the pressing amount to the lock slider 28 and the stopper 22 from the cam lever 23 in advance, and there is no fear that the axial force becomes insufficient when the cam lever 23 is brought into the fixed position and improper fitting of the base portion 21 and the stopper 22 (namely, improper fixing of the windshield 7) occurs. Further, a special tool is not required in operation of the cam lever 23, and the cam lever 23 can be easily operated manually. Furthermore, there is also provided an advantage of clearly discriminating the fixed state and the fixation release state of the windshield 7 by referring to the rotation (moving) position of the cam lever 23 that is the operation member.

The cam lever 23 has the lever portion 23b facing downward from the lever hinge 24 in the fixed position, and is brought into the fixation release position by raising the lever portion 23b. Therefore, even when a foreign matter (branch or the like) from above contacts the cam lever 23 during travelling of the motorcycle 1, rotation of the cam lever 23 to the fixation release position is difficult to cause, and unintentional release of fixation of the windshield 7 can be prevented. Further, since the cam lever 23 is provided in the vicinity of the lower edge of the windshield 7, an amount of the cam lever 23 overlapping the windshield 7 decreases (see FIG. 1) by the lever portion 23b faces downward in the fixed position, and an influence that the holder 20 has on the front view around the windshield 7 can be decreased more.

The cam lever 23 is provided with the resistance application portion 23f and the resistance application portion 23g that act to maintain the fixed position by giving resistance to rotation from the fixed position. Thereby, a behavior of the cam lever 23 that becomes the cause of unintentional release of fixation of the windshield 7 hardly occurs, and the fixed state of the windshield 7 is more reliably maintained. Further, since rattling and displacement of the cam lever 23 in the fixed position are suppressed, appearance quality is improved, vibration and abnormal noise at the time of travelling of the motorcycle 1, entrapment of a foreign matter into the periphery of the cam lever 23 and the like can be prevented.

The resistance application portion 23f is provided between the fixation holding surface 23c and the cam surface 23e, and abuts on the lock slider 28 between the fixed position and the fixation release position. Therefore, when the cam lever 23 is rotated from the fixation release position to the fixed position, the rider senses the rotation resistance by the resistance application portion 23f just before the fixed position, and can recognize arrival at the fixed position. As a result, it is possible to prevent an incomplete operation of stopping the rotation of the cam lever 23 in a position before reaching the fixed position, and a forced operation of excessively rotating the cam lever 23 beyond the fixed position to give a damage to the holder 20.

The holder 20 is excellent in load resistance performance in the rising and lowering direction because the continuous depressions-and-projections portions 21d of the base portion 21 and the depressions-and-projections portion 22d of the stopper 22 fit the plurality of crests and the plurality of troughs that are continuous to each other. Further, in the state where the continuous depressions-and-projections portions 21d and the depressions-and-projections portion 22d are fitted, movement of the stopper 22 in the left-right direction is suppressed by the restraining wall 21e of the base portion 21. Accordingly, the holder 20 can stably fix the windshield 7 firmly, and there is no fear that unintentional release of fixation of the windshield 7 by an external force other than the operation of the cam lever 23 occurs.

The base portion 21 to be a target to fit to the stopper 22 is attached to the support plate portion 17c of the frame bracket 17 so as to be supported from a rear side (lower side). In other words, the base portion 21 is supported by the support plate portion 17c on the extension line in the moving direction in which the stopper 22 approaches the base portion 21. The frame bracket 17 is a frame member that configures a part of the frame structure of the motorcycle 1, and can reliably receive the pressing force from the front that is transmitted from the stopper 22 to the base portion 21 at the time of fixing the windshield 7 by the strong frame structure. Consequently, as compared with a structure in which a fixing portion is provided at each of the stays 11, the holding force by the holder 20 can be set to be high, and stabler fixation of the windshield 7 can be realized.

As above, in the windshield device for vehicle of the present embodiment, height adjustment of the windshield 7 can be performed by an operation to the holder 20 at the one spot that is provided separately from the pair of stays 11, and the windshield device is excellent in stability of the windshield 7 in the fixed state, and operability at the time of height adjustment of the windshield 7.

Note that the present invention can be carried out by being variously changed without being limited to the above described embodiment and modifications. In the above described embodiment and modifications, the configurations and control illustrated in the accompanying drawings are not restrictive, but can be properly changed within the range in which the effect of the present invention is exhibited. In addition, it is possible to carry out the present invention by properly changing the configurations and control illustrated in the accompanying drawings within the range without departing from the object of the present invention.

Although in the above described embodiment, the cam lever 23 is used as the operation member that causes the stopper 22 to move to contact and separate from the base portion 21, but it is also possible to use an operation member other than the cam lever. For example, a slide member that linearly moves in the rising and lowering direction and the left-right direction may be adopted as the operation member, and a moving force of the slide member may be configured to be converted into a moving force of the stopper 22.

In the above described embodiment, the cam lever 23 rotates along the rising and lowering direction of the windshield 7, but a cam lever that operates in a direction other than the rising and lowering direction may be adopted. As an example, a cam lever that rotates in the left-right direction can also be used.

In the above described embodiment, the continuous depressions-and-projections portions 21d and the depressions-and-projections portion 22d that can change the fixed position in the plurality of stages in the rising and lowering direction are used as means that fixes the stopper 22 to the base portion 21, but it is also possible to use fixing means other than these portions. For example, on the base portion 21 side, fixing holes may be provided in a plurality of positions in the rising and lowering direction, whereas on the stopper 22 side, fixing projections that are selectively engaged in these holes are provided, and the position of the windshield 7 may be fixed by engagement of the projection and the hole.

In the above described embodiment, the frame bracket 17 is fixed to the subframe 18, but a support member corresponding to the frame bracket 17 may be directly fixed to the main frame of the motorcycle 1.

In the above described embodiment, lengths of the vertically elongated hole 11b on the stay 11 side and the slide guide groove 21b of the base portion 21 are set to be substantially equal, and the movable range of the windshield 7 is set by combination of both of them, but only the vertically elongated hole 11b on the stay 11 side, or only the slide guide groove 21b of the base portion 21 (state where the nut 32 abuts on the upper and lower ends of the slide guide groove 21b) may be set as the movable range of the windshield 7.

In the above described embodiment, the number of holders 20 is one, and the holder 20 is provided in the middle of the pair of stays 11 in the vehicle body left-right direction, in particular, the center in the vehicle body left-right direction, but a plurality of holders 20 may be disposed in such a manner that a pair of holders 20 are disposed in the vehicle left-right direction, for example. Further, the holder 20 may be disposed on an outer side of the stay 11.

The vehicle including the windshield device of the present invention is not limited to motorcycles, but application to all vehicles including movable windshields is possible, such as tricycles, four wheelers, and other transport machines.

As described above, the windshield device for a vehicle of the present invention has an effect of being able to perform height adjustment of the windshield easily with the simple structure, and is particularly useful in a motorcycle or the like in which height adjustment of the windshield is performed with a high frequency, and quick height adjustment of the windshield is required.

REFERENCE SIGNS LIST

1: motorcycle
2: vehicle body
3: handle
7: windshield
7a: recessed portion
7b: through-hole
11: stay
15: slider
17: frame bracket (frame member)
17c: support plate portion
19: back plate
20: holder
21: base portion
21b: slide guide groove
21d: continuous depressions-and-projections portion
22: stopper
22d: depressions-and-projections portion
23: cam lever
23c: fixation holding surface
23d: fixation release surface
23e: cam surface
23f: resistance application portion
23g: resistance application portion (second resistance application portion)
24: lever hinge
25: center bolt
27: stopper holder
28: lock slider
29: cushion
30: lock cover
32: nut
33: spring

What is claimed is:

1. A windshield device for a vehicle, the vehicle including a windshield located in front of a rider, and a support structure that supports the windshield such that a position of the windshield is adjustable in a rising and lowering direction,
wherein:
the support structure comprises:
a pair of stays that are provided at different positions in a left-right direction of a vehicle body of the vehicle, and that movably support the windshield in the rising and lowering direction to the vehicle body; and
a holder that is provided at a position different from the positions at which the pair of stays are provided, and that fixes a position of the windshield in the rising and lowering direction,
the holder comprises:
a base portion that is fixed to the vehicle body;
a stopper that is provided on the windshield to face the base portion, the stopper being movable along the rising and lowering direction with respect to the base portion and being further movable in a direction to approach and separate from the base portion, and the stopper bringing the windshield into a fixed state when approaching the base portion; and
an operation member that is provided on the windshield and that causes the stopper to move to contact and separate from the base portion, according to an operation thereof, and
the operation member presses the stopper in a direction in which the stopper approaches the base portion when the windshield is brought into the fixed state.

2. The windshield device according to claim 1, wherein the base portion is supported by a frame member of the vehicle body at a position on an extension line in the direction in which the stopper approaches the base portion.

3. The windshield device according to claim 1, wherein:
the operation member comprises a cam lever that changes a pressing amount to the stopper by rotation thereof, and that is rotatable between a fixed position in which the operation member presses the stopper against the base portion to bring the windshield into the fixed state, and a fixation release position in which the operation member releases pressing of the stopper to the base portion, and
the cam lever includes a resistance application portion that gives a larger pressing amount than a pressing amount given to the stopper in the fixed position so as to increase rotation resistance of the cam lever, in a middle of a rotational range from the fixation release position to the fixed position.

4. The windshield device according to claim 3, wherein the resistance application portion presses the stopper at a position close to the fixed position of the rotational range of the cam lever.

5. The windshield device according to claim 3, wherein:
the cam lever includes a fixation holding surface that faces the stopper side in the fixed position, and a cam surface that faces the stopper side between the fixed position and the fixation release position, and
the resistance application portion comprises a protruding portion having a larger amount of protrusion in a radial direction than the fixation holding surface and the cam surface.

6. The windshield device according to claim 3, wherein the cam lever includes a second resistance application portion that increases rotation resistance to rotation of the cam lever in an opposite direction to a side where the resistance application portion is provided, when the cam lever is in the fixed position.

7. The windshield device according to claim 1, wherein the holder is located in a middle of the pair of stays in the left-right direction, and is located closer to a lower edge of the windshield than to an upper edge of the windshield in the rising and lowering direction.

8. The windshield device according to claim 3, wherein the windshield has a recessed portion that recesses rearwardly along a front-rear direction of the vehicle body, and the stopper and the cam lever are mounted on the recessed portion.

9. The windshield device according to claim 8, wherein the recessed portion is provided at a position adjacent to a lower edge of a middle position of the windshield, which is supported by the pair of stays.

10. The windshield device according to claim 1, wherein:
the stopper includes a flange that is integrally formed with the stopper and that protrudes around an outer periphery of the stopper,
the flange is provided at an opposite side of the holder with respect to the windshield in the direction in which the stopper approaches the base portion, and the flange is configured to protrude so that the flange faces a part of the windshield in the direction in which the stopper approaches the base portion.

11. The windshield device according to claim 2, wherein the base portion, to which the stopper engages, is mounted on a support plate portion that is an integral part of the frame member in such a manner that the support plate portion supports the base portion on the extension line in the direction in which the stopper approaches the base portion.

\* \* \* \* \*